L. R. SCHMERTZ.
TOOL FOR HANDLING AND MANIPULATING VEHICLE TIRES AND WHEELS.
APPLICATION FILED MAR. 28, 1919.
1,345,889. Patented July 6, 1920.
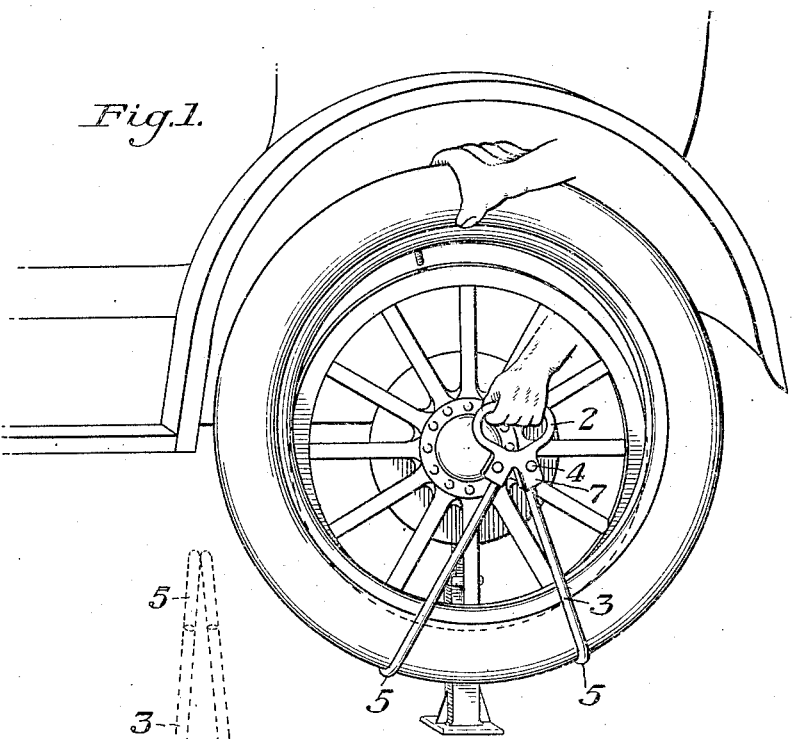
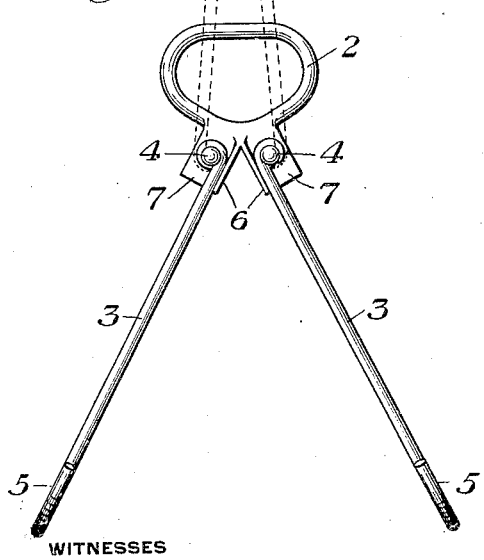
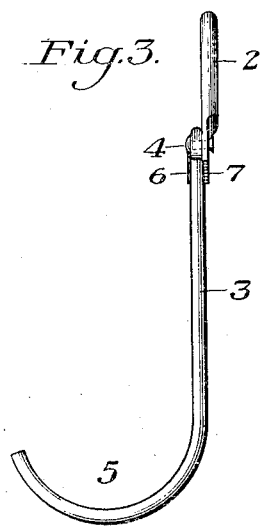
WITNESSES
R. A. Balderson
F. Trainor
INVENTOR
L. R. Schmertz

UNITED STATES PATENT OFFICE.

LOUIS R. SCHMERTZ, OF JEANNETTE, PENNSYLVANIA.

TOOL FOR HANDLING AND MANIPULATING VEHICLE TIRES AND WHEELS.

1,345,889.      Specification of Letters Patent.      Patented July 6, 1920.

Application filed March 28, 1919. Serial No. 285,893.

*To all whom it may concern:*

Be it known that I, LOUIS R. SCHMERTZ, a citizen of the United States, residing at Jeannette, in the county of Westmoreland and State of Pennsylvania, have invented a new and useful Improvement in Tools for Handling and Manipulating Vehicle Tires and Wheels, of which the following is a full, clear, and exact description, reference being had to the accompanying drawing, forming part of this specification, in which—

Figure 1 is a perspective view illustrating one use of a tool embodying my invention.

Fig. 2 is a plan view of the tool, the tool when folded being shown in dotted lines, and Fig. 3 is a side view of the same.

My invention has relation to a tool for handling and manipulating vehicle tires and wheels; and is designed to provide a simple, convenient and efficient device of this character. The tool is particularly advantageous in applying and removing pneumatic tires on automobile wheels, and may also be used for applying and removing the wheels themselves, and also for carrying tires and wheels. The tool may also be used for a variety of other purposes.

In the accompanying drawing in which I have shown a preferred embodiment of my invention, the numeral 2 designates a loop form of handle to which the two legs 3 are pivoted at 4. Each of these legs is formed at its lower end with a hook portion 5 which is shaped to engage a pneumatic tire or a wheel rim. When in use the two legs 3 occupy the downwardly diverging positions shown in Figs. 1 and 2, being held from swinging downwardly and inwardly by means of the stop flanges 6 on the lug extension 7 of the handle, to which extensions the legs are pivoted.

The manner of using the device in applying or removing a tire will be readily understood from Fig. 1. Supposing the tire is being removed, after its fastenings have been released, the tool is engaged therewith in the manner shown in Fig. 1, and the lower portion of the tire is pulled outwardly off the rim. This lower portion is then held by the tool in one hand while the other portion of the tire is grasped by the hand and manipulated to free the valve tube from the rim.

By the use of this tool not only is the work of handling, removing and replacing tires and wheels greatly facilitated and rendered much easier, but the hands and clothes are largely protected from being soiled by contact with these tires or wheels being handled. When not in use the legs 3 may be turned backwardly into the position shown in dotted lines in Fig. 2. The tool then occupies but little space and may be readily carried in the tool-kit.

I do not wish to limit myself to the exact form of tool which I have shown and described, since various changes may be made in the details thereof without departing from the spirit and scope of my invention, and defined in the appended claims.

I claim:

1. A portable hand tool of the character described, comprising a handle, an extension formed thereon, hooked legs pivotally secured to said extension on one side thereof and adapted to be swung into inoperative position to overlie said handle and extension, and swung to operative position to engage the object to be lifted, and stops on said extension limiting the pivotal movement of said legs when swung to operative position, said stops permitting unrestricted swinging to inoperative position, substantially as described.

2. A portable hand tool of the character described, comprising a handle having an extension thereon and a pair of pivoted legs secured to said extension, each of said legs being formed at its free end with a hooked portion adapted in inoperative position to project downwardly away from the handle and extend under the object to be lifted from the same side thereof, and when in inoperative position to entirely overlie said handle and said extension, substantially as described.

3. A portable hand tool of the character described for lifting circular objects, comprising a handle portion having a gripping opening therethrough, lugs on said handle portion, a pair of legs pivotally secured to said lugs, the axes of said pivots extending at substantially right angles to said gripping opening so that the legs may be swung to inoperative position to overlie said handle portion, hooked ends on said legs projecting in the same direction and adapted to extend under the object to be lifted from the same side thereof, and stops on said lugs adapted to hold said legs in diverging relation when in operative position, substantially as described.

In testimony whereof I have hereunto set my hand.

LOUIS R. SCHMERTZ.